US012742079B2

(12) United States Patent
Huang et al.

(10) Patent No.: US 12,742,079 B2

(45) Date of Patent: Sep. 22, 2026

(54) ELECTROLUMINESCENT FLEXOGRAPHIC PRINTING INK AND PREPARATION METHOD THEREOF

(71) Applicant: Beijing Institute Of Graphic Communication, Beijing (CN)

(72) Inventors: Beiqing Huang, Beijing (CN); Xianfu Wei, Beijing (CN); Yongjian Wu, Beijing (CN); Wan Zhang, Beijing (CN); Yingqun Qi, Beijing (CN); Yusheng Lian, Beijing (CN); Yingjie Xu, Beijing (CN); Hui Wang, Beijing (CN); Yun Qiao, Beijing (CN); Lijuan Liang, Beijing (CN); Linhong Huang, Beijing (CN); Yuxin Wang, Beijing (CN); Chuangji Liu, Beijing (CN)

(73) Assignee: Beijing Institute Of Graphic Communication, Beijing (CN)

( * ) Notice: Subject to any disclaimer, the term of this patent is extended or adjusted under 35 U.S.C. 154(b) by 459 days.

(21) Appl. No.: 18/392,490

(22) Filed: Dec. 21, 2023

(65) Prior Publication Data

US 2024/0209222 A1 Jun. 27, 2024

(30) Foreign Application Priority Data

Dec. 23, 2022 (CN) ........................ 202211665996.9

(51) Int. Cl.

| | |
|---|---|
| ***C09D 11/03*** | (2014.01) |
| ***B41M 1/04*** | (2006.01) |
| ***C09D 5/22*** | (2006.01) |
| ***C09D 11/101*** | (2014.01) |
| *B41F 5/24* | (2006.01) |

(52) U.S. Cl.

CPC ................ *C09D 11/03* (2013.01); *C09D 5/22* (2013.01); *C09D 11/101* (2013.01); *B41F 5/24* (2013.01); *B41M 1/04* (2013.01); *B41P 2200/12* (2013.01)

(58) Field of Classification Search

CPC ..... C09D 11/03; C09D 11/033; C09D 11/037; C09D 11/50; C09D 11/52; B41M 1/04; B41P 2200/12; C09K 11/06

See application file for complete search history.

(56) References Cited

U.S. PATENT DOCUMENTS

2011/0180826 A1* 7/2011 Morito ...................... B41F 3/58 257/89

FOREIGN PATENT DOCUMENTS

| | | | |
|---|---|---|---|
| CN | 114316684 A * | 4/2022 | |
| WO | WO-2017102048 A1 * | 6/2017 | ............ C09D 11/50 |

* cited by examiner

*Primary Examiner* — Matthew E. Hoban

(74) *Attorney, Agent, or Firm* — Bayramoglu Law Offices LLC

(57) ABSTRACT

An electroluminescent flexographic printing ink and a preparation method thereof. The ink includes, in parts by weight, the following components: 0.5 parts to 2 parts by weight of an electroluminescent material; 120 parts to 150 parts by weight of a monomer; 10 parts to 20 parts by weight of a prepolymer; and 0 part to 5 parts by weight of a leveling agent; wherein the electroluminescent ink for flexographic printing of the luminescent layer of the electroluminescent device does not comprise a pigment; and the electroluminescent ink for flexographic printing of the luminescent layer of the electroluminescent device has a particle size of less than 0.1 μm, a viscosity of 20 cP to 2,000 cP at 25° C., a surface tension of 18 mN/m to 37 mN/m at 25° C., and a curing time of 10 min to 30 min.

13 Claims, No Drawings

ELECTROLUMINESCENT FLEXOGRAPHIC PRINTING INK AND PREPARATION METHOD THEREOF

CROSS REFERENCE TO RELATED APPLICATION

This application claims the benefit and priority of Chinese Patent Application No. 2022116659969 entitled "Electroluminescent flexographic printing ink and preparation method thereof" filed with the China National Intellectual Property Administration on Dec. 23, 2022, the disclosure of which is incorporated by reference herein in its entirety as part of the present application.

TECHNICAL FIELD

The present disclosure belongs to the technical field of printing and reproduction, and relates to an electroluminescent flexographic printing ink and a preparation method thereof.

BACKGROUND

Organic electroluminescent materials, hereinafter referred to as electroluminescent materials, have been valued and developed rapidly in the existing technology due to fast response, high luminous efficiency, and wide viewing angle range.

There are many high-performance electroluminescent devices on the market in the prior art. However, traditionally the required electroluminescent material is directly evaporated onto a substrate by vacuum evaporation to prepare a luminescent layer of the electroluminescent device. A film produced by the process has low density and poor adhesion, and is difficult to be used for mass production.

There has also been research on methods for preparing the luminescent layer of electroluminescent devices by using inkjet printing so far. However, due to a limited scope of application, the inkjet printing is only suitable for the production of small batches of printed matter or the production of certain electronic components, showing a relatively limited coverage of traditional printed matters.

Electroluminescent printing inks should meet both electroluminescent performance and desirable printing performance, which are inherently contradictory in some aspects. For example, satisfactory printing performance requires a sufficient resin component, but the resin component could hinder electroluminescence.

SUMMARY

In view of the above technical problems to be solved, the present disclosure aims to provide an electroluminescent ink for flexographic printing of a luminescent layer of an electroluminescent device and a preparation method thereof, so as to form an electroluminescent pattern by a traditional flexographic printing method and meet excellent printing adaptability.

To achieve the foregoing object, the present disclosure provides the following technical solutions.

The present disclosure provides an ink for printing of a luminescent layer of an electroluminescent device, which is mainly suitable for flexographic printing, including/consisting of an electroluminescent material, a monomer, a prepolymer, and a leveling agent in parts by weight as follows:

ink formula:

0.5 parts to 2 parts by weight of the electroluminescent material;

120 parts to 150 parts by weight of the monomer;

10 parts to 20 parts by weight of the prepolymer; and 0 part to 5 parts by weight of the leveling agent.

In some embodiments, the electroluminescent material is an aluminum metal complex Alq3, which could be used as a luminescent material and also be used as an electron transmission material; the device prepared from Alq3 has a low voltage drive and a high brightness; and the original particle size is less than 100 nm.

In some embodiments, the monomer is one or a mixture of two or more selected from the group consisting of methylbenzene, 1,2-dimethylbenzene, 1,4-dimethylbenzene, N-methylpyrrolidone, butyl acetate, o-xylene, N,N-dimethylformamide, dimethyl sulfoxide, methanol, acetone, tetrahydrofuran, 1,2-dichloroethane, chlorobenzene, anisole, 3,4-dimethylanisole, o-dichlorobenzene, and tetralin.

In some embodiments, the prepolymer is one or a mixture of two or more selected from the group consisting of acrylic resins B-805, B-801, and B-814 purchased from Shanghai DSM (China) Co., Ltd., a hydroxy acrylic resin HU57035, a poly(vinyl chloride-co-isobutylvinylether) resin MP45, and a polyurethane resin for inks purchased from Dongguan Ruihuan Plastic Technology Co., Ltd.

In some embodiments, the leveling agent is a polysiloxane-polyether copolymer, such as TEGO450, TEGO410, and TEGO450 purchased from TEGO Company.

The present disclosure provides a method for preparing the electroluminescent ink as described in the above solutions, comprising the following steps:

(1) subjecting the electroluminescent material and a part of the monomer to pre-dispersing by using an electric stirrer (at a speed of 200 r/min to 600 r/min) for 30 min to 60 min to dissolve the electroluminescent material, and then filtering to obtain a component A, which is stored away from light;

(2) heating and stirring the prepolymer and another part of the monomer by using a multi-head magnetic heating stirrer at a speed of 200 r/min to 600 r/min for 30 min to 60 min to dissolve the prepolymer in the monomer, to obtain a component B; and (3) mixing the component A, the component B, a remaining part of the monomer, and the leveling agent according to the ink formula to obtain a mixed system, and stirring the mixed system by using an electric stirrer (at a speed of 200 r/min to 600 r/min) for 30 min to 60 min to be uniform to obtain the ink.

Some embodiments of the present disclosure have the following advantages.

1. A fast and high-quality printing performance of the ink could be achieved. The ink according to the present disclosure does not comprise a pigment. The electroluminescent material is used to replace the pigment to ensure that the electroluminescent material has a particle size in the ink system of less than 0.1 μm. Moreover, various properties of the ink, such as viscosity, surface tension, adhesion, and resistance, are consistent with those of ordinary flexographic printing inks. The ink according to the present disclosure could be used on traditional flexographic printing machines and could be printed on a variety of substrates.

2. The ink has a reduced amount of resin components. In order to avoid the influence of resin on the electroluminescent material as much as possible, the amount of resin in the ink is reduced as much as possible to ensure that the electroluminescent material could emit light normally.

3. The ink according to the present disclosure has a content of the electroluminescent material of not less than 0.3%, ensuring the content of the electroluminescent material in the luminescent layer after curing the ink and thus ensuring the luminescence quality of the prepared electroluminescent device.

The electroluminescent flexographic printing ink according to the present disclosure meets the requirements of flexographic printing, and has a particle size of less than 0.1 μm, a viscosity of 20 cP to 2,000 cP (at 25° C.), and a surface tension of 18 mN/m to 37 mN/m (at 25° C.); the ink could be completely cured in 10 min to 30 min, meeting the requirements of flexographic printing. The ink shows broad substrate compatibility and could be printed on various substrate such as polyethylene terephthalate (PET) films, glass, and paper. A resulting printed matter is completely dry on both interior and surface, and also exhibits a desirable adhesion, a leveling, and a durability. Moreover, the ink has a low proportion of the prepolymer, thus not affecting luminescence of the electroluminescent material.

DETAILED DESCRIPTION OF THE EMBODIMENTS

The present disclosure will be further described below with reference to specific examples. It should be understood that these examples are only intended to describe the present disclosure, rather than to limit the scope of the present disclosure. In addition, various changes or modifications could be made according to the present disclosure by those skilled in the art, and these equivalent embodiments also fall within the scope of the present disclosure. The proportions in the examples of the present disclosure are all based on parts by weight.

In the examples, the electroluminescent material is Alq3, that is, 8-hydroxyquinoline and aluminum. The Alq3 is also called an organic light-emitting diode (OLED) and is capable of emitting light when being energized. During the production by using some existing equipment, the above materials are generally printed on some required panels by means of screen printing. However, whether the materials cloud be used to make traditional ink and used in traditional common printing is a problem that will be solved in specific embodiments. To this end, these specific embodiments provide the following technical solutions, namely examples.

Example 1

1 part of an electroluminescent material (Alq3), 75 parts of a solvent (o-xylene:N,N-dimethylformamide=8:7), and 10 parts of a TEGO410 leveling agent were mixed to obtain a mixture. The mixture was placed on a constant-temperature magnetic stirrer and stirred for 30 min to be uniform, and then filtered to obtain an electroluminescent ink component A.

75 parts of a monomer o-xylene and 40 parts of a prepolymer acrylic resin B-814 were mixed to be uniform to obtain a mixture. The mixture was mixed with the electroluminescent ink component A, and then stirred by a stirrer for 30 min to obtain an electroluminescent ink.

Example 2

1 part of an electroluminescent material (Alq3), 75 parts of a solvent (o-xylene:dimethyl sulfoxide=4:1), and 10 parts of a TEGO410 leveling agent were mixed to obtain a mixture. The mixture was placed on a constant-temperature magnetic stirrer and stirred for 30 min to be uniform, and then filtered to obtain an electroluminescent ink component A.

75 parts of a monomer o-xylene and 40 parts of a prepolymer acrylic resin B-814 were mixed to be uniform to obtain a mixture. The mixture was mixed with the electroluminescent ink component A, and then stirred by a stirrer for 30 min to obtain an electroluminescent ink.

Example 3

1 part of an electroluminescent material (Alq3), 50 parts of a solvent (N-methylpyrrolidone:dimethyl sulfoxide=1:1), and 10 parts of a TEGO410 leveling agent were mixed to obtain a mixture. The mixture was placed on a constant-temperature magnetic stirrer and stirred for 30 min to be uniform, and then filtered to obtain an electroluminescent ink component A.

90 parts of a monomer o-xylene and 40 parts of a prepolymer acrylic resin B-814 were mixed to be uniform to obtain a mixture. The mixture was mixed with the electroluminescent ink component A, and then stirred by a stirrer for 30 min to obtain an electroluminescent ink.

Example 4

0.5 parts of an electroluminescent material (Alq3), 75 parts of a solvent (N-methylpyrrolidone:acetone=2:3), and 10 parts of a TEGO410 leveling agent were mixed to obtain a mixture. The mixture was placed on a constant-temperature magnetic stirrer and stirred for 30 min to be uniform, and then filtered to obtain an electroluminescent ink component A.

75 parts of a monomer o-xylene and 40 parts of a prepolymer acrylic resin B-814 were mixed to be uniform to obtain a mixture. The mixture was mixed with the electroluminescent ink component A, and then stirred by a stirrer for 30 min to obtain an electroluminescent ink.

Example 5

0.5 parts of an electroluminescent material (Alq3), 75 parts of a solvent (o-xylene:acetone=1:4), and 10 parts of a TEGO450 leveling agent were mixed to obtain a mixture. The mixture was placed on a constant-temperature magnetic stirrer and stirred for 30 min to be uniform, and then filtered to obtain an electroluminescent ink component A.

75 parts of a monomer o-xylene and 40 parts of a prepolymer acrylic resin B-814 were mixed to be uniform to obtain a mixture. The mixture was mixed with the electroluminescent ink component A, and then stirred by a stirrer for 30 min to obtain an electroluminescent ink.

Example 6

2 parts of an electroluminescent material (Alq3), 90 parts of a solvent (chlorobenzene:acetone=4:1), and 10 parts of a TEGO410 leveling agent were mixed to obtain a mixture. The mixture was placed on a constant-temperature magnetic stirrer and stirred for 30 min to be uniform, and then filtered to obtain an electroluminescent ink component A.

60 parts of a monomer o-xylene and 40 parts of a prepolymer acrylic resin B-814 were mixed to be uniform to obtain a mixture. The mixture was mixed with the electroluminescent ink component A, and then stirred by a stirrer for 30 min to obtain an electroluminescent ink.

Example 7

1 part of an electroluminescent material (Alq3), 75 parts of a solvent (chlorobenzene:acetone=4:1), and 10 parts of a TEGO450 leveling agent were mixed to obtain a mixture. The mixture was placed on a constant-temperature magnetic stirrer and stirred for 30 min to be uniform, and then filtered to obtain an electroluminescent ink component A.

75 parts of a monomer o-xylene and 40 parts of a prepolymer acrylic resin B-805 were mixed to be uniform to obtain a mixture. The mixture was mixed with the electroluminescent ink component A, and then stirred by a stirrer for 30 min to obtain an electroluminescent ink.

Example 8

1 part of an electroluminescent material (Alq3), 75 parts of a solvent (chlorobenzene:dichloroethane=1:1), and 10 parts of a TEGO450 leveling agent were mixed to obtain a mixture. The mixture was placed on a constant-temperature magnetic stirrer and stirred for 30 min to be uniform, and then filtered to obtain an electroluminescent ink component A.

A monomer o-xylene and 40 parts of a prepolymer acrylic resin B-805 were mixed to be uniform to obtain a mixture. The mixture was mixed with the electroluminescent ink component A, and then stirred by a stirrer for 30 min to obtain an electroluminescent ink.

Example 9

1 part of an electroluminescent material (Alq3), 75 parts of a solvent (chlorobenzene:dimethyl sulfoxide=1:1), and 10 parts of a TEGO450 leveling agent were mixed to obtain a mixture. The mixture was placed on a constant-temperature magnetic stirrer and stirred for 30 min to be uniform, and then filtered to obtain an electroluminescent ink component A.

A monomer o-xylene and 40 parts of a prepolymer acrylic resin B-805 were mixed to be uniform to obtain a mixture. The mixture was mixed with the electroluminescent ink component A, and then stirred by a stirrer for 30 min to obtain an electroluminescent ink.

The performance of the inks prepared in Examples 1 to 9 is shown in Table 1. The electroluminescent ink according to the present disclosure meets the requirements of traditional flexographic printing, and has a particle size of less than 0.1 μm, a viscosity of 20 cP to 2,000 cP (at 25° C.), and a surface tension of 18 mN/m to 37 mN/m (at 25° C.); the ink could be completely cured in 10 min to 30 min, meeting the requirements of flexographic printing. The ink shows broad substrate compatibility and could be printed on various substrates such as PET films, glass, and paper. A resulting printed matter is completely dry on both interior and surface, and also exhibits a desirable adhesion, a leveling, and a durability. Moreover, the ink has a low proportion of the prepolymer and thus not affecting luminescence of the electroluminescent material.

TABLE 1

Performance of inks prepared in Examples 1 to 9

| Example SN | Particle size (μm) | Viscosity (Pa · s) | Surface tension (mN/m) | Curing time (min) |
|---|---|---|---|---|
| 1 | <0.1 | 0.53 | 20.61 | 25 |
| 2 | <0.1 | 0.89 | 31.91 | 25 |
| 3 | <0.1 | 1.87 | 33.19 | 30 |
| 4 | <0.1 | 0.71 | 23.20 | 20 |
| 5 | <0.1 | 0.47 | 19.74 | 15 |
| 6 | <0.1 | 0.43 | 25.20 | 15 |
| 7 | <0.1 | 0.42 | 25.74 | 15 |
| 8 | <0.1 | 0.58 | 26.19 | 20 |
| 9 | <0.1 | 0.68 | 31.19 | 25 |

Note:
The viscosity and surface tension were tested at 25° C., and curing was conducted at 25° C.

The inks prepared in Examples 1 to 9 are completely dry both on surface and interior after curing.

In other embodiments of the present disclosure, the prepolymers, electroluminescent materials, monomers, and leveling agents listed in the summary of the present disclosure, which are different from those in Examples 1 to 9, could be used in different assemblies and combinations, and the same performance and application effect as that of the ink herein could be obtained. The ink according to the present disclosure is prepared by stirring and could be applied to traditional flexographic printing equipment.

The objects, technical solutions, and beneficial effects of the present disclosure are further described in detail in the above specific embodiments. It should be understood that the above described are merely specific embodiments of the present disclosure, and are not intended to limit the scope of the present disclosure. Any modification, equivalent replacement or improvement made within the spirit and principle of the present disclosure should fall within the scope of the present disclosure.

What is claimed is:

1. An electroluminescent ink for flexographic printing of a luminescent layer of an electroluminescent device, comprising, in parts by weight, the following components:

0.5 parts to 2 parts by weight of an electroluminescent material;

120 parts to 150 parts by weight of a monomer;

10 parts to 20 parts by weight of a prepolymer; and 0 part to 5 parts by weight of a leveling agent;

wherein the electroluminescent ink for flexographic printing of the luminescent layer of the electroluminescent device does not comprise a pigment; and the electroluminescent ink for flexographic printing of the luminescent layer of the electroluminescent device has a particle size of less than 0.1 μm, a viscosity of 20 cP to 2,000 cP at 25° C., a surface tension of 18 mN/m to 37 mN/m at 25° C., and a curing time of 10 min to 30 min.

2. The electroluminescent ink for flexographic printing of the luminescent layer of the electroluminescent device according to claim 1, wherein the monomer is one or a mixture of two or more selected from the group consisting of methylbenzene, 1,2-dimethylbenzene, 1,4-dimethylbenzene, N-methylpyrrolidone, butyl acetate, o-xylene, N,N-dimethylformamide, dimethyl sulfoxide, methanol, acetone, tetrahydrofuran, 1,2-dichloroethane, chlorobenzene, anisole, 3,4-dimethylanisole, o-dichlorobenzene, and tetralin.

3. The electroluminescent ink for flexographic printing of the luminescent layer of the electroluminescent device according to claim 1, wherein the prepolymer is one or a mixture of two or more selected from the group consisting of an acrylic resin, a hydroxy acrylic resin, a poly(vinyl chloride-co-isobutylvinylether) resin, and a polyurethane resin.

4. The electroluminescent ink for flexographic printing of the luminescent layer of the electroluminescent device according to claim 1, wherein the leveling agent is a polysiloxane-polyether copolymer.

5. The electroluminescent ink for flexographic printing of the luminescent layer of the electroluminescent device according to claim 1, wherein the electroluminescent printing ink is used for flexographic printing on a polyethylene terephthalate (PET) film, a glass, or a paper.

6. A method for preparing the electroluminescent ink for flexographic printing of the luminescent layer of the electroluminescent device according to claim 1, comprising the following steps:

(1) subjecting the electroluminescent material and a part of the monomer to pre-dispersing by using an electric stirrer at a speed of 200 r/min to 600 r/min for 30 min to 60 min to dissolve the electroluminescent material, and then filtering to obtain a component A, which is stored away from light;

(2) heating and stirring the prepolymer and another part of the monomer by using a multi-head magnetic heating stirrer at a speed of 200 r/min to 600 r/min for 30 min to 60 min to dissolve the prepolymer in the monomer, to obtain a component B; and (3) mixing the component A, the component B, a remaining part of the monomer, and the leveling agent according to a formula of the electroluminescent ink to obtain a mixed system, and stirring the mixed system by using an electric stirrer at a speed of 200 r/min to 600 r/min for 30 min to 60 min to be uniform to obtain the electroluminescent ink.

7. The electroluminescent ink for flexographic printing of the luminescent layer of the electroluminescent device according to claim 2, wherein the electroluminescent printing ink is used for flexographic printing on a polyethylene terephthalate (PET) film, a glass, or a paper.

8. The electroluminescent ink for flexographic printing of the luminescent layer of the electroluminescent device according to claim 3, wherein the electroluminescent printing ink is used for flexographic printing on a polyethylene terephthalate (PET) film, a glass, or a paper.

9. The electroluminescent ink for flexographic printing of the luminescent layer of the electroluminescent device according to claim 4, wherein the electroluminescent printing ink is used for flexographic printing on a polyethylene terephthalate (PET) film, a glass, or a paper.

10. The method for preparing the electroluminescent ink for flexographic printing of the luminescent layer of the electroluminescent device according to claim 6, wherein the monomer is one or a mixture of two or more selected from the group consisting of methylbenzene, 1,2-dimethylbenzene, 1,4-dimethylbenzene, N-methylpyrrolidone, butyl acetate, o-xylene, N,N-dimethylformamide, dimethyl sulfoxide, methanol, acetone, tetrahydrofuran, 1,2-dichloroethane, chlorobenzene, anisole, 3,4-dimethylanisole, o-dichlorobenzene, and tetralin.

11. The method for preparing the electroluminescent ink for flexographic printing of the luminescent layer of the electroluminescent device according to claim 6, wherein the prepolymer is one or a mixture of two or more selected from the group consisting of an acrylic resin, a hydroxy acrylic resin, a poly(vinyl chloride-co-isobutylvinylether) resin, and a polyurethane resin.

12. The method for preparing the electroluminescent ink for flexographic printing of the luminescent layer of the electroluminescent device according to claim 6, wherein the leveling agent is a polysiloxane-polyether copolymer.

13. The method for preparing the electroluminescent ink for flexographic printing of the luminescent layer of the electroluminescent device according to claim 6, wherein the electroluminescent printing ink is used for flexographic printing on a polyethylene terephthalate (PET) film, a glass, or a paper.

* * * * *